(12) United States Patent
Lee

(10) Patent No.: US 7,371,042 B2
(45) Date of Patent: *May 13, 2008

(54) METHOD AND APPARATUS FOR BALANCING GAS TURBINE ENGINES

(75) Inventor: Michael J. Lee, Peabody, MA (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/018,639

(22) Filed: Dec. 21, 2004

(65) Prior Publication Data

US 2008/0008589 A1 Jan. 10, 2008

(51) Int. Cl.
*F01D 25/04* (2006.01)
(52) U.S. Cl. ........................ 415/119; 416/144; 416/500
(58) Field of Classification Search .. 74/573.1–573.13, 74/572.1, 572.11, 572.4; 73/468; 60/772, 60/805; 29/407.05, 889.21; 415/119; 416/144, 416/145, 500; 464/180
See application file for complete search history.

(56) References Cited

U.S. PATENT DOCUMENTS

| | | | | | |
|---|---|---|---|---|---|
| 1,645,323 | A | * | 10/1927 | Griswold | 464/180 |
| 2,708,483 | A | * | 5/1955 | Camping et al. | 416/144 |
| 2,715,446 | A | * | 8/1955 | Felt | 416/145 |
| 2,861,471 | A | * | 11/1958 | Kronenberg | 74/571.11 |
| 3,916,495 | A | * | 11/1975 | Klassen et al. | 416/144 |
| 4,361,213 | A | * | 11/1982 | Landis et al. | 416/144 |
| 4,784,012 | A | * | 11/1988 | Marra | 416/144 |
| 5,011,374 | A | | 4/1991 | Miller | |
| 5,285,700 | A | * | 2/1994 | Lau | 416/144 |
| 5,545,010 | A | | 8/1996 | Cederwall et al. | |
| 5,767,403 | A | * | 6/1998 | Kopp et al. | 73/468 |
| 6,931,861 | B2 | * | 8/2005 | Wagner | 416/144 |
| 2004/0020216 | A1 | | 2/2004 | Wagner | |

(Continued)

FOREIGN PATENT DOCUMENTS

CA 2519687 A1 3/2006

(Continued)

OTHER PUBLICATIONS

Search Report; Place of Search—Munich; Reference No. 134519/11195; Application No./Patent No. 05257856.4-2315; Dated Dec. 22, 2006; 6 pgs.

*Primary Examiner*—Edward K. Look
*Assistant Examiner*—Dwayne J White
(74) *Attorney, Agent, or Firm*—William Scott Andes; Armstrong Teasdale LLP

(57) ABSTRACT

A method, system, and balanced rotating assembly are provided for field balancing an assembly including a power turbine. The method, system and assembly includes coupling the power turbine to a load, identifying a first balancing plane that is aft of the power turbine, and identifying a second balancing plane that is forward of the power turbine. A balancing correction is determined at each of the first and second balancing planes. A balance weight is mounted at the first balancing plane based on the balancing correction determined for the first balancing plane, and a balance weight is mounted at the second balancing plane based on the balancing correction determined for the second balancing plane, wherein each balance weight is coupled to at least two respective bolt head without removing the bolts.

20 Claims, 5 Drawing Sheets

U.S. PATENT DOCUMENTS

2006/0053882 A1 * 3/2006 Lee et al. .................. 73/460

FOREIGN PATENT DOCUMENTS

| | | |
|---|---|---|
| DE | 3531822 C1 | 1/1987 |
| DE | 4310165 A1 | 10/1993 |
| DE | 4310165 C2 | 10/1993 |
| DE | 60300600 T2 | 1/2004 |
| EP | 1380722 A1 | 1/2004 |
| EP | 1637696 A2 | 3/2006 |
| GB | 2265964 A | 10/1993 |
| JP | 2006083854 A | 3/2006 |

* cited by examiner

METHOD AND APPARATUS FOR BALANCING GAS TURBINE ENGINES

BACKGROUND OF THE INVENTION

This invention relates generally to gas turbine engines, and more specifically to methods and apparatus for balancing an assembly that includes a gas turbine engine.

At least some known gas turbine engines include, in serial flow arrangement, a compressor, a combustor, a high pressure turbine, and a low pressure turbine. The compressor, combustor and high pressure turbine are sometimes collectively referred to as the gas generator or core engine. Compressed air is channeled from the compressor to the combustor where it is mixed with fuel and ignited. The combustion gasses are channeled to the turbines which extract energy from the combustion gasses to power the compressors and to produce useful work to propel an aircraft in flight or to power a load, such as an electrical generator.

Balancing turbine engines facilitates the avoidance of potentially destructive vibrational forces during engine operation. Balancing is achieved by rotating the assembly and determining the magnitude and location of each imbalance. Material is then added or removed to correct the unbalance. Generally, the rotating components are balanced individually, and after the components are assembled, the assembly is then balanced to correct for any cumulative unbalance in the assembly. Within at least some applications, the low pressure turbine or power turbine is coupled to other rotating components that necessitate further balancing.

Within at least some known engine assemblies, the power turbine, is coupled to a generator. When the engine is installed in a vessel, it is desirable that the engine and generator be field balanced as installed to facilitate preventing the generation of potentially damaging vibrational forces being induced to the surrounding vessel. At least some known engines are balance utilizing a plurality of balance weights. In use, at least one balance weight is coupled to the engine to facilitate reducing the vibrational forces on the surrounding vessel, whereas some engines may require a significant amount of unbalance correction. Therefore, an additional quantity of weights are coupled to the engine. However, coupling a plurality of balance weights to the engine results in a relatively time consuming process. Specifically, each respective weight must be attached to a respective bolt. Accordingly, when the engine requires a significant amount of unbalance correction, there may be an insufficient quantity of bolts available for weight attachment.

BRIEF DESCRIPTION OF THE INVENTION

In one aspect, a method is provided for field balancing a gas turbine engine assembly including a power turbine. The method includes coupling the power turbine to a load, identifying a first balancing plane that is aft of the power turbine, and identifying a second balancing plane that is forward of the power turbine. A balancing correction is determined at each of the first and second balancing planes. A balance weight is mounted at the first balancing plane based on the balancing correction determined for the first balancing plane, and a balance weight is mounted at the second balancing plane based on the balancing correction determined for the second balancing plane, wherein each balance weight is coupled to at least two respective bolt heads without removing the bolts.

In another aspect, a system for balancing a rotating assembly including a gas turbine engine is provided. The system includes a plurality of couplers configured to couple the engine to a rotating load such that torque from the engine is transmitted to the rotating load through the plurality of couplers. Each coupler includes a head portion, an elongated shank portion extending from the head portion along a longitudinal axis of the coupler, and a threaded stud extending from the head portion along the longitudinal axis and opposite the shank portion. A balance weight is configured to be coupled to at least two of the plurality of couplers.

In another aspect, a balanced rotating assembly is provided that includes a rotating load, a gas turbine engine drivingly coupled to the rotating load, and a balancing system. The balancing system includes a plurality of fasteners located at a balancing plane for the assembly. Each of the fasteners is configured to couple the engine to the rotating load such that torque from the engine is transmitted to the rotating load. Each fastener includes a head portion, an elongated shank portion extending from the head portion along a longitudinal of the fastener, and a stud extending from the head portion along the longitudinal axis and opposite the shank portion. A balance weight is configured to be coupled to at least two of the plurality of fasteners.

DETAILED DESCRIPTION OF THE INVENTION

Figure 1:
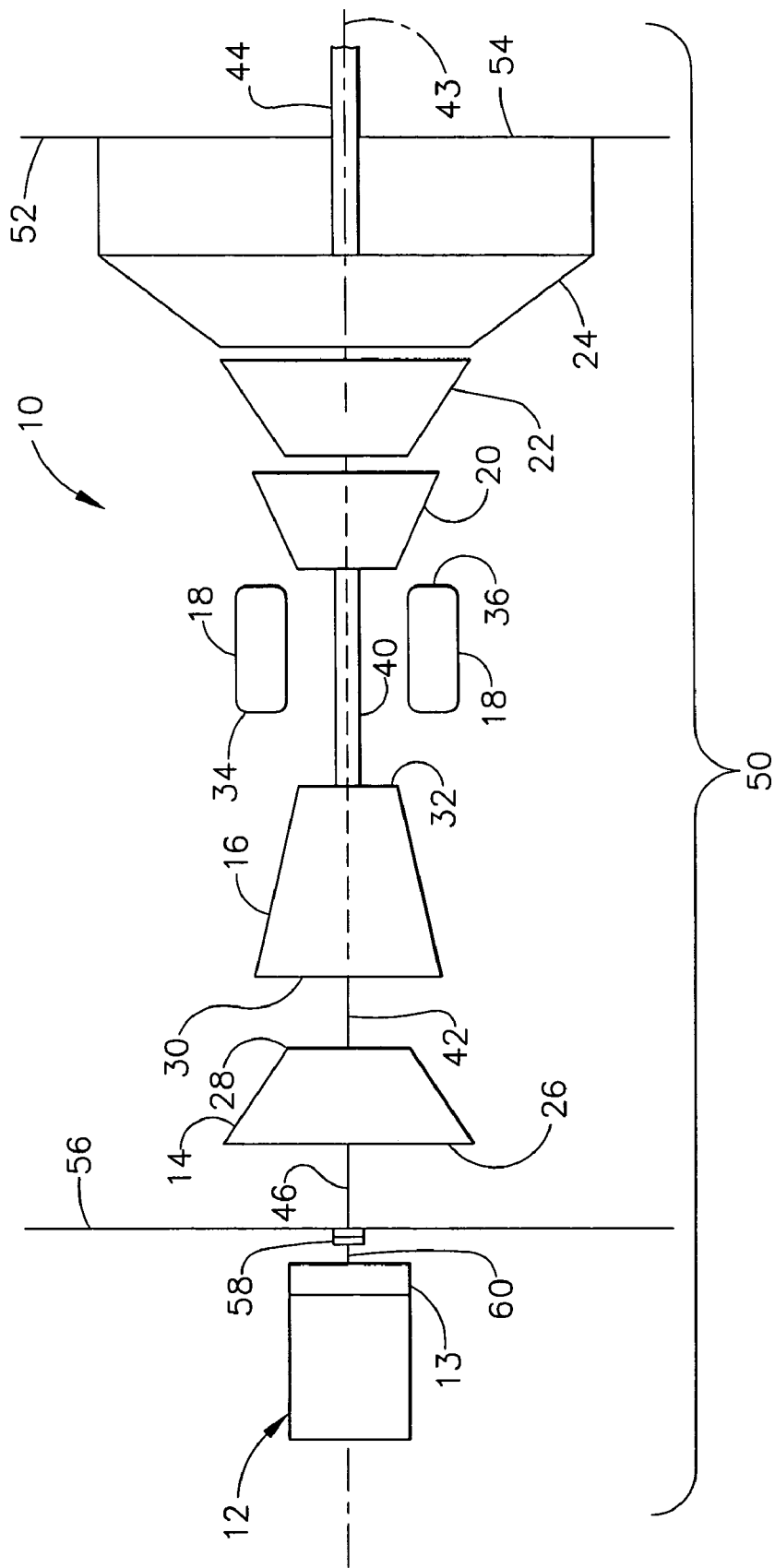
FIG. 1 is a block diagram of an exemplary gas turbine engine including a generator.

FIG. 1 is a block diagram of a gas turbine engine 10 in an installation wherein engine 10 is used to power a load such as an electric generator which is generally represented at 12. Generator 12 may be driven through a gearbox section 13. Hereinafter, references to generator 12 shall be understood to also include gearbox section 13. The engine 10 includes, in serial flow relationship, a low pressure compressor or booster 14, a high pressure compressor 16, a combustor 18, a high pressure turbine 20, a low pressure, or intermediate, turbine 22, and a power turbine 24. Low pressure compressor or booster 14 has an inlet 26 and an outlet 28. High pressure compressor 16 includes an inlet 30 and an outlet 32. Combustor 18 has an inlet 34 that is substantially coincident with high pressure compressor outlet 32, and an outlet 36. High pressure turbine 20 is coupled to high pressure compressor 16 with a first rotor shaft 40, and low pressure turbine 22 is coupled to low pressure compressor 14 with a second rotor shaft 42. Rotor shaft 42 is coaxially positioned within first rotor shaft 40 about a longitudinal centerline axis 43 of engine 10. In one embodiment, gas turbine engine 10 is an LM500 engine commercially available from General Electric Company, Cincinnati, Ohio.

During operation, outside air is drawn into inlet 26 of low pressure compressor 14, wherein the air is compressed and supplied from low pressure compressor 14 to high pressure compressor 16. High pressure compressor 16 compresses the air additionally and delivers high pressure air to combustor 18 wherein it is mixed with fuel and ignited to generate high temperature combustion gases. The combustion gases are channeled from combustor 18 to drive turbines 20, 22, and 24.

While the invention will be described in terms of an electrical generator driven by a gas turbine engine, it should be understood that the following description is only for illustrative purposes and is but one potential application of the inventive concepts herein. It is appreciated that the benefits and advantages of the invention may accrue equally to other types of loads that may be powered by a gas turbine engine such as the engine 10.

In one embodiment of engine 10, power turbine 24 and low pressure turbine 22 are both coupled to second rotor shaft 42. Generator 12 is coupled to a forward extension shaft 46 of second rotor shaft 42. Engine 10 may also be used to drive a load (not shown) which may be located aft of engine 10 and may be drivingly coupled to a power turbine shaft 44. Placement of the load forward of engine 10 offers an advantage of locating the load away from the heat of the exhaust of engine 10.

Engine 10 and generator 12 form a power generation unit 50. Although engine 10 and generator 12 are balanced as separate units, it is also necessary to balance power generation unit 50 to facilitate the avoidance of destructive vibration that could damage engine 10 or generator 12. Balancing power generation unit 50 in two planes facilitates reducing vibration levels during operation of power generation unit 50.

In one embodiment of the invention, a first or aft balancing plane 52 is identified at an aft end 54 of power turbine 24 and a second balancing plane 56 is identified forward of power turbine 24 at a coupling 58 between forward extension shaft 46 and a drive shaft or input shaft 60 of generator 12. Balancing plane 56 is selected to extend through a bolted joint 70 (see FIG. 2) that couples extension shaft 46 to coupling 58.

Heretofore, balancing has been accomplished by removing a nut from a load carrying shank of a bolt at the balancing plane and adding a balance weight or balance washer to the bolt and replacing the nut. This is readily accomplished at aft balancing planes, such as plane 52, due to the accessibility of power turbine 24. However, in some applications, access to a bolted joint at second or forward balancing planes, such as plane 56, may be restricted.

In one embodiment, extension shaft 46, coupling 58 and drive shaft 60 are enclosed in a cover 64 (see FIG. 2) that is provided to cover these rotating components so that personnel or other items do not inadvertently come into contact with extension shaft 46, coupling 58, and drive shaft 60. The cover 64 is provided with a port 66 at second balancing plane 56, to facilitate access to coupling 58, end 72 (see FIG. 2) of extension shaft 46, and drive shaft 60. However, access to coupling 58 at second balancing plane 56 is sufficiently restricted that removal of a nut or bolt for the attachment of balancing weights at coupling 58 is difficult.

Figure 2:
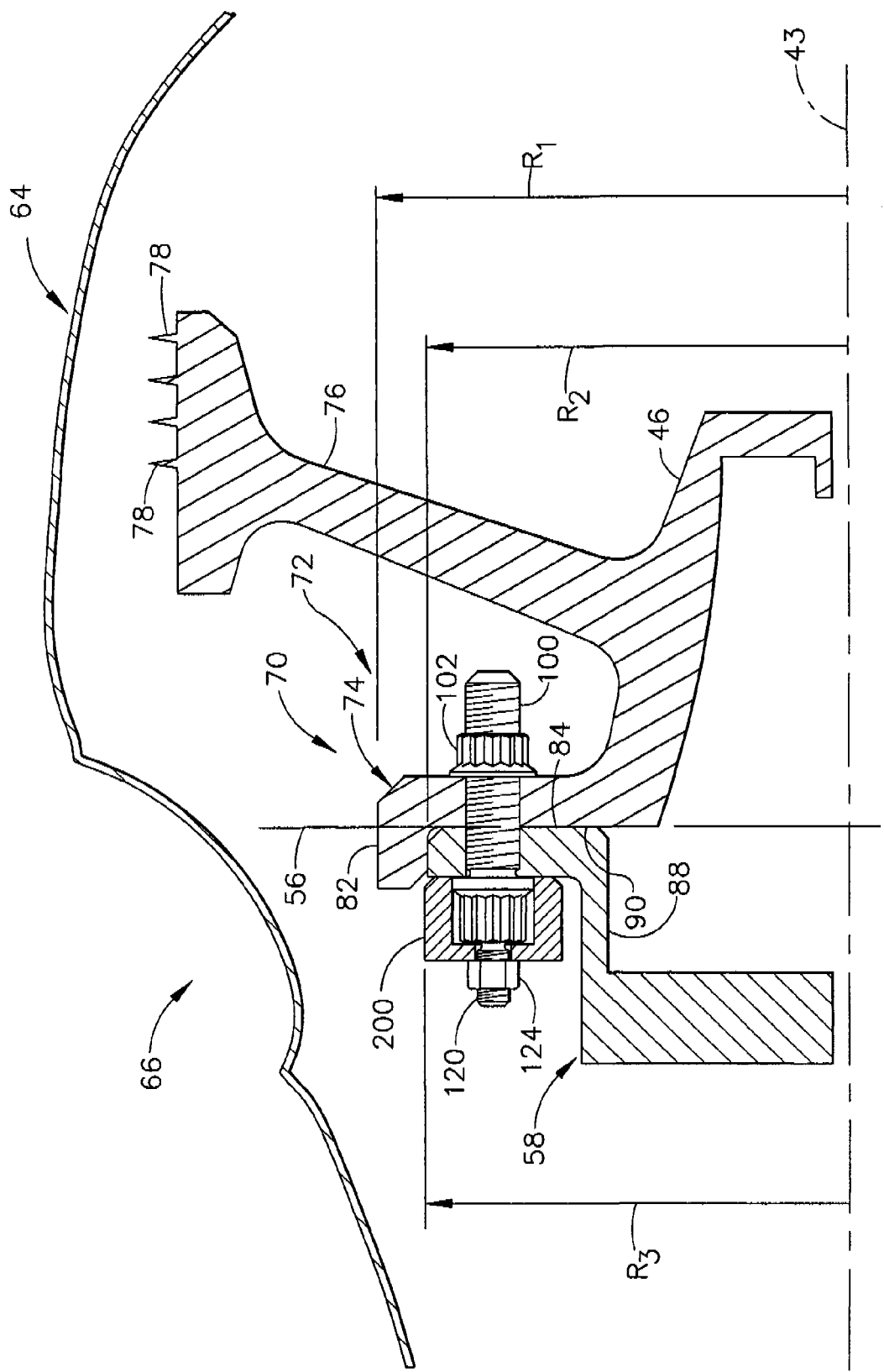
FIG. 2 is a schematic diagram of an exemplary bolted coupling joint that may be used with the gas turbine engine and generator shown in FIG. 1.

FIG. 2 is a schematic diagram of an exemplary bolted coupling joint 70 to couple generator 12 and extension shaft 46 to drivingly connect engine 10 and generator 12. More specifically, bolted joint 70 couples extension shaft 46 to coupling 58 which is joined to drive shaft 60 (see FIG. 1). Extension shaft 46 has a forward mounting end 72 that includes a circumferential mounting flange 74 and a disk 76 that includes a plurality of seals 78. In one embodiment, seals 78 are labyrinth or knife edge seals that seal against a sealing surface (not shown) formed on an inner surface of drive shaft cover 64 to facilitate minimizing a leakage of gas into the area of coupling 58 in the coupling and drive shaft cover 64. Seals 78 also facilitate the establishment of a thrust balance on the low pressure rotor system including low pressure turbine 22, power turbine 24, and low pressure compressor 14. Mounting flange 74 includes a circumferential lip 82 that extends forwardly from flange 74 and a mating face 84. Lip 82 includes a first or outer radius $R_1$ and a second or inner radius $R_2$ that is smaller than radius $R_1$. In one embodiment, lip 82 is continuous, however, in other embodiments, lip 82 may be segmented.

Coupling 58 includes a circumferential coupling flange 88 that has a mating face 90. Coupling flange 88 has an outer radius $R_3$ that is sized such that coupling flange 88 is received within lip 82 so that coupling flange mating face 90 abuts mating face 84 on extension shaft 46. A coupling bolt 100 and coupling nut 102 are provided to hold coupling flange 88 and extension shaft mounting flange 74 together.

Figure 3:
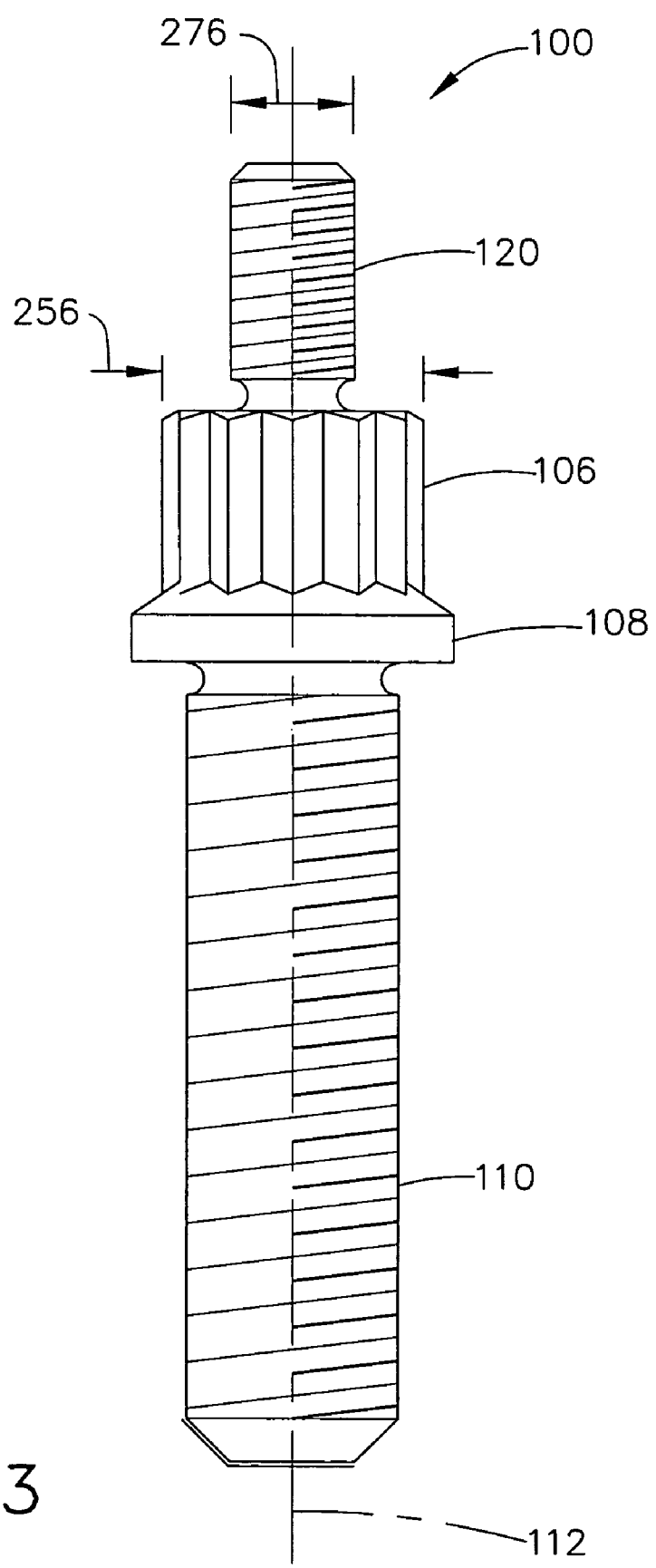
FIG. 3 is a plan view of a coupling bolt shown in FIG. 2.

FIG. 3 is a plan view of coupling bolt 100 shown in FIG. 2. Bolt 100 includes a bolt head 106 that includes a shoulder 108. An elongated shank portion 110 extends from shoulder 108 along a longitudinal axis 112 of bolt 100. Shank portion 110 receives nut 102 to form bolted joint 70 (FIG. 2) at second balancing plane 56. Shank portion 110 and coupling nut 102 are load carrying members at the bolted joint 70. Shank portion 110 transmits a driving torque load from engine 10 to generator 12. Shank portion 110 and coupling nut 102 also provide the clamping load that holds coupling 58 and extension shaft 46 together at bolted joint 70. Bolt 100 also includes a stud 120 that extends from bolt head 106 along longitudinal axis 112 opposite in direction to shank portion 110. In the exemplary embodiment, stud 120 is integrally formed with bolt head 106.

Bolt head 106 and stud 120 are accessible through access port 66 in drive shaft cover 64. Stud 120 is configured to receive a balancing weight or balancing washer 200 (see FIG. 2). Balancing washer 200 is selected to be of a predetermined weight that is calculated to provide a balancing weight adjustment at second balancing plane 56 that is required to balance engine and generator assembly 50. A retaining nut 124 (see FIG. 2) is provided to retain balancing washer 200 on stud 120.

Figure 4:
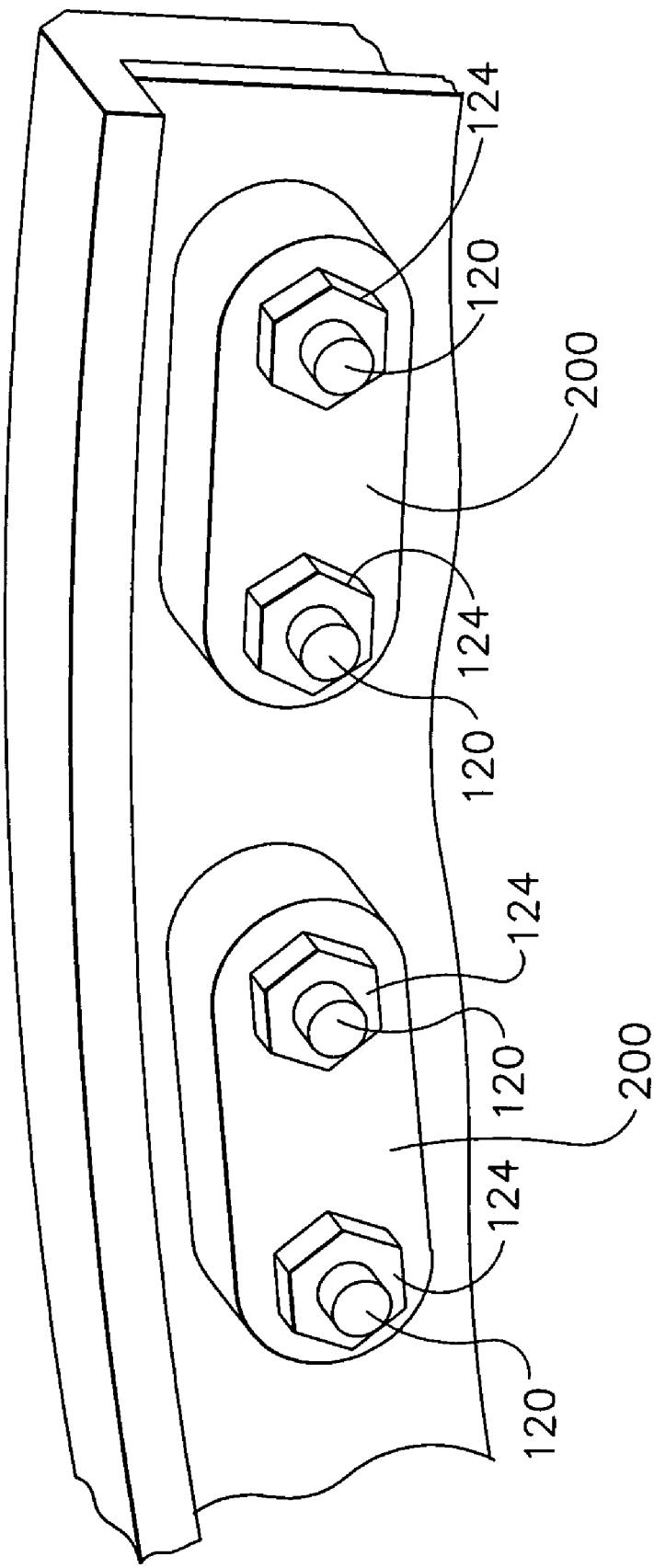
FIG. 4 is an end view of the exemplary bolted coupling joint shown in FIG. 2 including a plurality of coupling bolts.
Figure 5:
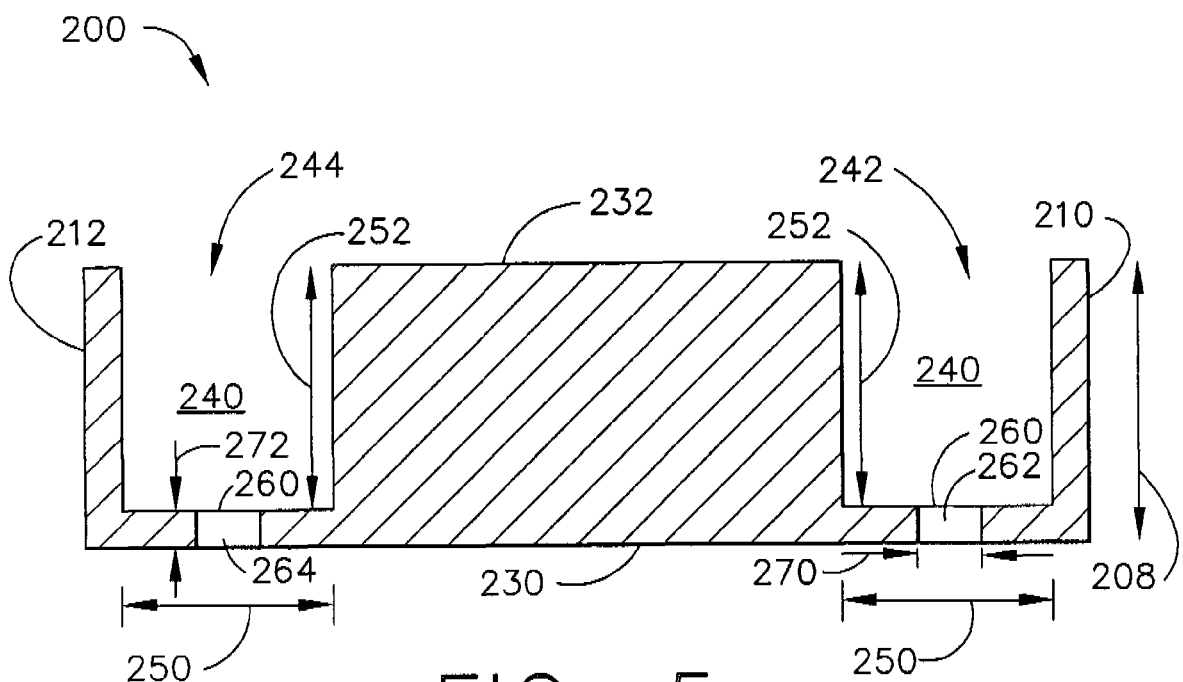
FIG. 5 is a side view of an exemplary balancing weight.

FIG. 4 is an end view of the exemplary bolted coupling joint 88 shown in FIG. 2 including a plurality of coupling bolts 100 and an exemplary balancing weight 200. FIG. 5 is a side view of a balancing washer or weight 200.

Figure 6:
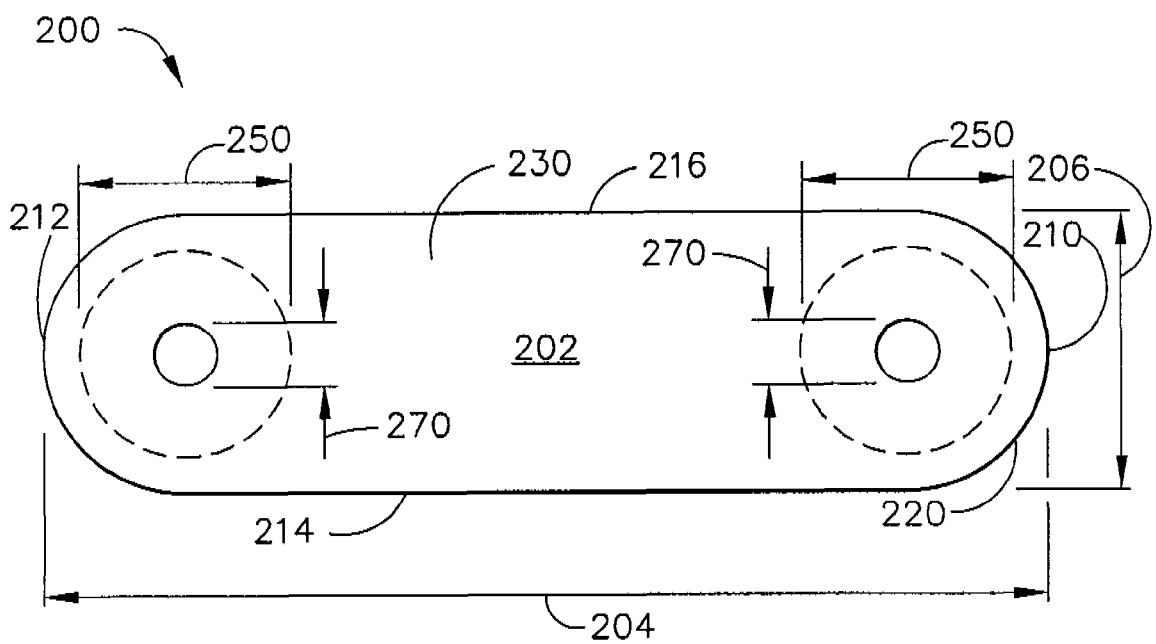
FIG. 6 is a top view of the balancing weight shown in FIG. 5.

FIG. 6 is a top view of balancing washer 200. In the exemplary embodiment, balancing washer 200 includes a body portion 202 having length 204, a width 206, and a thickness 208. In the exemplary embodiment, thickness 208 is sized such that balancing washer has a predetermined weight. More specifically, thickness 208 may be increased to increase the weight of balancing washer 200, or alternatively, thickness 208 may be reduced to reduce the weight of balancing washer 200. In the exemplary embodiment, balancing washer 200 is formed as a unitary balancing washer. In an alternative embodiment, balancing washer 200 is fabricated from a plurality of pieces that are coupled together using a welding procedure for example.

In the exemplary embodiment, balancing washer 200 includes a first side 210, a second side 212 that is opposite first side 210, a third side 214 that is substantially perpendicular to first and second sides 210 and 212, respectively, and a fourth side 216 that is substantially parallel to third side 214. Accordingly, balancing washer 200 is substantially rectangular and includes a plurality of rounded corners 220.

Balancing washer 200 includes an upper surface 230 and a lower surface 232 that is opposite and approximately parallel to upper surface 230 that are separated by width 208. In the exemplary embodiment, balancing washer 200 is fabricated from a metallic material, such as, but not limited to Inconel 718. In an alternative embodiment, balancing washer is not fabricated from a metallic material.

Balancing washer 200 includes a first plurality of substantially cylindrical openings 240. In the exemplary embodiment, balancing washer 200 includes a first opening 242 and a second opening 244 that each extend at least partially through body 202. More specifically, each respective opening 242 and 244 extends from lower surface 232 at least partially through body 202. Each respective opening 242 and 244 has a diameter 250 and a depth 252. In the exemplary embodiment, openings 242 and 244 are each sized to receive a portion of a respective bolt head 106 shown in FIG. 2. More specifically, diameter 250 is substantially similar to a width 256 of bolt head 106 and depth 252 is substantially similar to a thickness 254 of bolt head 106 such that each respective opening 242 and 244 circumscribes and substantially surrounds a respective bolt head 106 after balancing washer 200 is installed. In an exemplary embodiment balancing washer 200 includes at least a pair of openings 240.

Balancing washer 200 includes a second plurality of substantially cylindrical openings 260. In the exemplary embodiment, balancing washer 200 includes a third opening 262 and a fourth opening 264 that each extend at least partially through body 202. More specifically, each respective opening 262 and 264 extends from upper surface 230 at least partially through body 202 to openings 242 and 244, respectively. Each respective opening 262 and 264 has a diameter 270 and a depth 272. In the exemplary embodiment, openings 262 and 264 are each sized to receive a portion of a respective stud 120 shown in FIG. 2. More specifically, diameter 270 is substantially similar to a width 276 of stud 120 and depth 272 is sized such that each respective stud 120 extends through each respective opening 262 and 264 such that a respective nut 124 shown in FIG. 2 can be coupled to each respective stud 120. In an exemplary embodiment balancing washer 200 includes at least a pair of openings 260.

In operation, the engine 10 is set up and balanced prior to being coupled to generator 12. Engine 10 is then coupled to generator 12 and the assembly 50 is driven and the unbalance measured. Balance adjustments are then calculated for first balancing plane 52 aft of power turbine 24 and second balancing plane 56 forward of power turbine 24. At forward balancing plane 56, balancing weights 200 are selected to provide the required correction and are installed on one or more of bolt heads 106 as required. Access to bolts 100 is gained through a port 66 in drive shaft cover 64. In the exemplary embodiment, each respectively balancing weight 200 is coupled to two respective bolt heads 106 and then secured to each respective bolt 100 using two fasteners 124. Although the exemplary embodiment, illustrates a substantially rectangular balancing weight 200 that includes two configured to couple to two bolts 100, it should be realized that balancing weight 200 may have a substantially curvilinear shape and include three or more openings such that balancing weight 200 may be coupled to three or more bolts 100 simultaneously.

The above-described balancing washer facilitates final trim balancing of the power generation system as installed in the field. The balancing system includes a bolt having a stud integrally formed on the head of the bolt such that balancing weights or washers may be mounted and secured to the head of the bolt without removal of the load carrying nut from the load carrying shank portion of the bolt. Moreover, the balancing system includes a balancing washer configured to straddle two or more bolts and thereby utilize the space between adjacent bolts for additional weight. Additionally, the balancing washer described herein facilitates reducing the amount of time required to install multiple balance weights on multiple bolts, thereby reducing the time required to balance the gas turbine engine. Accordingly, the balance weight described herein allows balancing the engine utilizing a single washer, thereby eliminating the need to assemble multiple washers on multiple bolts to reduce vibration.

Exemplary embodiments of a balancing washer for a power generation assembly that includes a gas turbine engine are described above in detail. The systems and assembly components are not limited to the specific embodiments described herein, but rather, components of each system may be utilized independently and separately from other components described herein. Each balancing washer can also be used in combination with other systems.

While the invention has been described in terms of various specific embodiments, those skilled in the art will recognize that the invention can be practiced with modification within the spirit and scope of the claims.

What is claimed is:

1. A method for field balancing a gas turbine engine assembly including a power turbine, said method comprising:
    coupling the power turbine to a load;
    identifying a first balancing plane that is aft of the power turbine;
    identifying a second balancing plane that is forward of the power turbine;
    determining a balancing correction at each of the first and second balancing planes;
    mounting a first balance weight at the first balancing plane based on the balancing correction determined for the first balancing plane; and
    mounting a second balance weight at the second balancing plane based on the balancing correction determined for the second balancing plane, wherein the first and second balance weights are each coupled to at least two respective bolt heads of at least two bolts without removing the bolts.

2. A method in accordance with claim 1 further comprising forming a stud integrally with each of the at least two respective bolt heads such that the stud has a first diameter and each of the at least two respective bolt heads has a second diameter that is greater than the first diameter.

3. A method in accordance with claim 1 further comprising mounting the first balance weight having at least a first pair of first balance weight openings having a first diameter and at least a second pair of first balance weight openings having a second diameter that is greater than the first diameter to the at least two respective bolt heads that are positioned at the first balancing plane based on the balancing correction determined for the first balancing plane.

4. A method in accordance with claim 3 further comprising coupling the first balance weight to the at least two respective bolts such the first pair of openings substantially circumscribe at least two of the studs and the second pair of first balance weight openings substantially circumscribe the at least two respective bolt heads.

5. A method in accordance with claim 4 further comprising coupling the second balance weight that includes a first pair of second balance weight openings that extend from a second balance weight upper surface to a second pair of second balance weight openings, the second pair of second balance weight openings extend from the first pair of second balance weight openings to a second balance weight lower surface to the at least two respective bolts.

6. A method in accordance with claim 1 further comprising determining a thickness of each of the first and second balance weights such that each of the first and second balance weights have a predetermined weight to offset an imbalance at the respective first and second balancing planes.

7. A method in accordance with claim 1 further comprising coupling at least two nuts to each of the at least two studs to retain the first and second balance weights.

8. A system for balancing a rotating assembly including a gas turbine engine, said system comprising:
  a plurality of couplers configured to couple the engine to a rotating load such that torque from the engine is transmitted to the rotating load through the plurality of couplers, each said coupler comprising a head portion, an elongated shank portion extending from said head portion along a longitudinal axis of said coupler, and a threaded stud extending from said head portion along said longitudinal axis and opposite said shank portion wherein an outer surface of said threaded stud is threaded; and
  a balance weight configured to be coupled to at least two of said plurality of couplers.

9. A system in accordance with claim 8 wherein said stud is integrally formed with said head portion, said stud comprises a first diameter, said head portion comprises a second diameter that is greater than said first diameter.

10. A system in accordance with claim 9 wherein said balance weight comprises at least a first pair of openings having a first diameter and at least a second pair of openings having a second diameter that is greater than said first diameter.

11. A system in accordance with claim 10 wherein said first pair of openings are sized to substantially circumscribe said stud and said second pair of openings are sized to substantially circumscribe said head portion.

12. A system in accordance with claim 11 wherein said first pair of openings extend from a balance weight upper surface to said second pair of openings, and said second pair of openings extend from said first pair of openings to a balance weight lower surface.

13. A system in accordance with claim 8 wherein said balance weight has a thickness that is selected such that said balance weight has a predetermined weight to offset an imbalance at a balancing plane.

14. A system in accordance with claim 8 further comprising at least two nuts received on said studs to retain said balance weight.

15. A balanced rotating assembly comprising:
  a rotating load;
  a gas turbine engine drivingly coupled to said load; and
  a balancing system comprising:
    a plurality of couplers configured to couple the engine to said rotating load such that torque from the engine is transmitted to the rotating load through the plurality of couplers, each said coupler comprising a head portion, an elongated shank portion extending from said head portion along a longitudinal axis of said coupler, and a threaded stud extending from said head portion along said longitudinal axis and opposite said shank portion wherein an outer surface of said threaded stud is threaded; and
    a balance weight configured to be coupled to at least two of said plurality of couplers.

16. A balanced rotating assembly in accordance with claim 15 wherein said stud is integrally formed with said head portion, said stud comprises a first diameter, said head portion comprises a second diameter that is greater than said first diameter.

17. A balanced rotating assembly in accordance with claim 16 wherein said balance weight comprises at least a first pair of openings having a first diameter and at least a second pair of openings having a second diameter that is greater than said first diameter.

18. A balanced rotating assembly in accordance with claim 17 wherein said first pair of openings are sized to substantially circumscribe said stud and said second pair of openings are sized to substantially circumscribe said head portion.

19. A balanced rotating assembly in accordance with claim 18 wherein said first pair of openings extend from a balance weight upper surface to said second pair of openings, and said second pair of openings extend from said first pair of openings to a balance weight lower surface.

20. A balanced rotating assembly in accordance with claim 15 wherein said balance weight has a thickness that is selected such that said balancing weight has a predetermined weight to offset an imbalance at a balancing plane.

* * * * *